(12) United States Patent
Flenniken et al.

(10) Patent No.: US 9,378,868 B2
(45) Date of Patent: Jun. 28, 2016

(54) LOW-SMOKE, NON-HALOGENATED FLAME RETARDANT COMPOSITION AND RELATED POWER CABLE JACKETS

(71) Applicant: Equistar Chemicals, LP, Houston, TX (US)

(72) Inventors: Cindy Flenniken, Clarksville, OH (US); Chun D. Lee, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 334 days.

(21) Appl. No.: 14/019,151

(22) Filed: Sep. 5, 2013

(65) Prior Publication Data

US 2015/0064465 A1 Mar. 5, 2015

(51) Int. Cl.

| H01B 7/295 | (2006.01) |
| C08K 13/02 | (2006.01) |
| C08L 23/12 | (2006.01) |
| C09K 21/02 | (2006.01) |

(52) U.S. Cl.
CPC ............... *H01B 7/295* (2013.01); *C08K 13/02* (2013.01); *C08L 23/12* (2013.01); *C09K 21/02* (2013.01); *C08L 2203/202* (2013.01); *Y10T 428/2942* (2015.01)

(58) Field of Classification Search
USPC ........................................ 428/380; 524/399
See application file for complete search history.

(56) References Cited

U.S. PATENT DOCUMENTS

| 5,218,027 A | 6/1993 | Smith et al. |
| 7,514,489 B2 | 4/2009 | Granada, Jr. et al. |
| 8,097,809 B2 | 1/2012 | Galletti et al. |
| 8,268,911 B2 | 9/2012 | Whaley |

FOREIGN PATENT DOCUMENTS

KR   20090122731 A   12/2009

OTHER PUBLICATIONS

International Search Report and Written Opinion Mailed Dec. 15, 2014 for International Application No. PCT/US2014/053893.

*Primary Examiner* — Lynda Salvatore (57) ABSTRACT

A low-smoke, non-halogenated flame retardant composition made from and/or containing polypropylene, magnesium dihydroxide, and aluminum magnesium layered double hydroxide modified with a hydrogenated fatty acid is disclosed. A composition containing and/or made from (a) a polypropylene, (b) a first distribution of magnesium dihydroxide particles having a d50 in the range of about 0.75 microns to about 1.25 microns, (c) a second distribution of magnesium dihydroxide particles having a d50 in the range of about 1.50 microns to about 3.50 microns, and (d) aluminum magnesium layered double hydroxide modified with a hydrogenated fatty acid is disclosed. A power cable having a jacket made from and/or containing a low-smoke non-halogenated flame retardant composition is also disclosed.

10 Claims, 2 Drawing Sheets

FIG. 1

LOW-SMOKE, NON-HALOGENATED FLAME RETARDANT COMPOSITION AND RELATED POWER CABLE JACKETS

FIELD OF THE INVENTION

In general, the present invention relates to a halogen-free flame retardant (HFFR) or low-smoke zero-halogen (LS0H) composition. Specifically, it relates to a low-smoke, non-halogenated flame retardant composition made from and/or containing polypropylene, magnesium dihydroxide (MDH, also know as magnesium hydroxide), and aluminum magnesium layered double hydroxide modified with a hydrogenated fatty acid.

The present invention also relates to an insulated wired, an insulated shielded wire, an insulated cable, and jacketed electrical cables, each having an insulation or jacket layer made from and/or containing a low-smoke, non-halogenated flame retardant composition. Alternatively, these cables are described as self-extinguishing cables.

DESCRIPTION OF RELATED ART

Flame retardant polymer compositions have been in use for several decades. Initially, there was significant reliance on halogens, mainly chlorine or bromine containing chemicals, to yield flame retardancy. Because halogens produce very toxic and corrosive combustion products in fires, the focus shifted to the development of halogen-free, flame retardant (HFFR) or low-smoke zero-halogen (LS0H) compounds. (Notably, acidic combustion products were capable of destroying expensive equipment and even such rugged electrical fixtures as fuse boxes, which may have avoided direct destruction by the flame or the heat of a fire.)

Halogen-free systems of modest cost have been restricted to polyolefins in terms of raw material. Unfortunately, polyolefins lack inherently good flame resistance. Additionally, the choice of halogen-free flame retardants was limited to certain hydrated minerals such as hydroxides, hydrated oxides, or hydrated salts of metals (particularly, alumina trihydrate (ATH) or magnesium dihydroxide (MDH)).

Magnesium dihydroxide provides excellent flame retardant properties, as well as smoke suppression, in a variety of plastics including wire and cable applications. Magnesium dihydroxide is also a non-toxic, non-corrosive additive, and it is often incorporated into elastomeric and plastic compounds where a non-halogen solution to fire resistance and smoke suppression is preferred.

According to one theory, magnesium dihydroxide and other metal hydrates function by releasing their water of hydration, preferably at temperatures above those required for processing but below those of combustion of the flame retardant composition. Specifically, magnesium dihydroxide undergoes an endothermic decomposition beginning at about 330 degrees Celsius according to Formula I below:

$$Mg(OH)_2 \xrightarrow{Heat} MgO + H_2O \qquad \text{I}$$

The water released during combustion has the effects of diluting the combustible gases and acting as a barrier to prevent oxygen from supporting the flame. The smoke suppression properties of magnesium dihydroxide are believed to be due to the dilution effect of the water vapor on the combustible gases or due to a char formation with the polymer. At relatively high concentrations, such additives also impair combustion by conducting heat relatively efficiently from burning surfaces. To maximize these flame-retardant effects, it is preferable that the flame retardant additives be present at maximum levels.

Despite the advantages of magnesium dihydroxide, its use can be problematic in certain applications. For instance, to obtain very high levels of flame retardant ability (e.g., Underwriters Laboratories' UL 94 rating), flame retardant additives must be added in large amounts, such as greater than 60 weight percent. This concentration of magnesium dihydroxide can adversely impact the physical properties (such as tensile strength and flexibility) and processing characteristics (such as viscosity) of the polymeric resin, thereby rendering the resulting composition unsuitable for certain applications. The UL standard defines various characteristics that products must satisfy, such as flame retardancy, thermal deformation, low-temperature characteristics, and initial and thermally-aged tensile characteristics of coating materials.

Accordingly, there remains a need in the art for compositions that offer even greater levels of fire protection without sacrificing the beneficial physical properties of the polymeric resin to which the flame retardant composition is added.

Surface treatment of magnesium dihydroxide has been used to impact the physical properties of polyolefin-based compositions. U.S. Pat. No. 5,211,746 sought to improve low-temperature properties of a polyethylene-based composition by surface treating the magnesium dihydroxide with a saturated or unsaturated carboxylic acid or a metal salt. U.S. Pat. No. 7,563,395 used a two-component surface treatment (higher fatty acid and methyl hydrogen silicone oil) to achieve desirable flame retardant and elasticity properties of a polyethylene-based composition.

Others have focused on physical and morphological characteristics of magnesium dihydroxide particles to impact physical and flame retardant properties of flame retardant compositions. U.S. Pat. No. 5,218,027 preferred that the flame-retardant, additive material have a relatively broad particle size distribution to facilitate processing of the compositions. At Col. 8, Ins. 10-15, the patent described a flame-retardant, additive material "with a distribution of about 0.5 to 60.0 mm and a median of about 2.5 mm," containing a coarse fraction and a fine fraction with the coarse fraction being about 60 weight percent.

U.S. Pat. No. 8,097,809 focused on average pore diameter of natural MDH and its physical characteristics of average particle size (d50) and specific surface area (BET), for improving the mechanical and flame retardant properties of a cable with a layer comprising such particles.

Cogen, et al., "Recent Developments in Low-Smoke Zero-Halogen Flame Retardant Polyolefins," Cellular Polymers (Nov. 1, 2006) noted that incorporation of high amounts of MDH into a polymer matrix to improve flame retardancy requires a tradeoff in terms of compromised physical and processing characteristics of the composite system.

Cogen evaluated four grades of MDH in a crosslinkable ethylene/vinyl acetate copolymer formulation, wherein the MDH grades have about the same average particle sizes and substantially similar surface areas. The varying properties found in the final compositions caused his team to conclude that differences in mechanical properties and flame resistance was more likely due to particle morphology rather than particle size.

With regard to magnesium dihydroxide and a secondary inorganic, flame-retardant filler, several references attempt to define the impact of the combination of flame retardants on physical and flame retardant properties of the resulting compositions. For example, the authors of "Synthetic Clay as a Flame Retardant for Low Smoke Halogen-Free Plastic Compounds," Plastic Technology Service Ltd., British Plastics & Rubber (Sep. 1, 2010) sought to overcome the deficiencies of MDH by replacing a portion of the MDH with an organically-modified synthetic clay based on magnesium aluminum layered double hydroxides. The polypropylene-based composition reportedly retained flame retardant performance with improved processability.

European Patent Application No. EP 2 551 296 A1 evaluated a stearic acid, surface-treated magnesium dihydroxide and a vinyl silane, surface-treated magnesium dihydroxide in an ethylene/vinyl acetate copolymer formulation, with and without a double salt of magnesium carbonate and calcium carbonate.

U.S. Pat. No. 7,514,489, discloses a magnesium dihydroxide composition for use as a flame-retardant additive in polymeric resin compositions, wherein the magnesium dihydroxide particles have a submicron particle size and a high particle surface area. In one embodiment, the '489 patent discloses a composition that has (a) a first distribution of magnesium dihydroxide particles having a d50 of no more than about 0.30 µm, a d90 of no more than about 1.5 µm, and a BET surface area of at least about 35 µm$^2$/g admixed with (b) a second distribution of magnesium dihydroxide particles having a d50 of at least about 0.9 µm and a BET surface area of no more than about 30 m$^2$/g. In this embodiment, the first distribution was kept to an amount of less than or equal to about 30 weight percent of the total polymer resin weight (with additives) and certainly less than the amount of the second distribution.

In another embodiment of the '489 patent, the first and second distributions were admixed with a plurality of nanoclay particles. The preferred nanoclay was derived from hydrotalcite, having the formula $Mg_5Al_2CO_3(OH)_{16}\cdot H_2O$.

U.S. Pat. No. 8,268,911 describes a polymer composition having a bimodal particle size distribution, wherein (a) the large particle size material has an average particle size about 1 micron and less than about 1.8 microns and (b) the small particle size material has an average particle size such that the average particle size of the large particle size material is 2.5 to 7 times greater the average particle size of the small particle size material. In a first instance, the inorganic fillers would be two separate components having different particle sizes. In another instance, the two separate components could be two grades of the same material.

Others hypothesize that the reduction in physical and processing properties of the resulting polymer/MDH mixture can be overcome by improving the affinity of magnesium dihydroxide with the polymer material. It is reasoned that the affinity of the magnesium dihydroxide to the polymer material is related to the magnesium dihydroxide's crystallinity, morphology, and purity. Accordingly, there have been so efforts towards modifying the properties of magnesium dihydroxide by improving its compatibility with the polymer matrix and improving its degree of purity.

U.S. Pat. No. 7,514,489, discloses a magnesium dihydroxide composition for use as a flame-retardant additive in polymeric resin compositions, wherein the magnesium dihydroxide particles typically exhibits hexagonal prism crystal shapes, had a submicron particle size, and had a high particle surface area. Similarly, U.S. Pat. No. 8,097,809 discloses that average pore diameter, average particle size (d50), and specific surface area (BET) of natural magnesium dihydroxide particles play a role in the mechanical and flame retardant properties of a cable with a layer comprising such particles.

SUMMARY OF THE INVENTION

In general embodiments, the present disclosure provides a low-smoke, non-halogenated flame retardant composition made from and/or containing polypropylene, magnesium dihydroxide, and aluminum magnesium layered double hydroxide modified with a hydrogenated fatty acid.

In some embodiments, the present disclosure provides a low-smoke, non-halogenated flame retardant composition containing and/or made from (a) a polypropylene, (b) a first distribution of magnesium dihydroxide particles having a d50 in the range of about 0.75 microns to about 1.25 microns, (c) a second distribution of magnesium dihydroxide particles having a d50 in the range of about 1.50 microns to about 3.50 microns, and (d) aluminum magnesium layered double hydroxide modified with a hydrogenated fatty acid. In some embodiments, the present disclosure provides a low-smoke, non-halogenated flame retardant composition made from and/or containing (a) a polypropylene, (b) a bimodal distribution of magnesium dihydroxide particles having (i) a first particle size peak in the range of about 0.75 microns to about 1.25 microns and (ii) a second particle size peak in the range of about 1.50 microns to about 3.50 microns, and (c) aluminum magnesium layered double hydroxide modified with a hydrogenated fatty acid.

Moreover, the present disclosure provides a power cable having:
 (a) a conductor core,
 (b) a semiconductive conductor shield,
 (c) an insulation layer,
 (d) a semiconductive insulation shield, and
 (e) a jacket made from and/or containing a low-smoke, non-halogenated flame retardant composition, which is made from and/or containing:
  (i) a polypropylene,
  (ii) a magnesium dihydroxide composition,
  (iii) aluminum magnesium layered double hydroxide modified with a hydrogenated fatty acid,
  (iv) a maleic anhydride grafted polyolefin, and
  (v) an ethylene/octene copolymer.

DESCRIPTION OF THE DRAWINGS

Further details will be apparent from the following detailed description, with reference to the enclosed drawing, in which.

DETAILED DESCRIPTION

The present invention now will be described more fully hereinafter. However, this invention may be embodied in many different forms and should not be construed as limited to the embodiments set forth herein; rather, these embodiments are provided so that this disclosure will satisfy applicable legal requirements. As used in this specification and the claims, the singular forms "a," "an," and "the" include plural referents unless the context clearly dictates otherwise.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

DEFINITIONS

In the present description, the term "α-olefin" means an olefin of formula $CH_2=CH-R$, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the term "BET surface area" refers to the surface area of particles measured in units of $m^2/g$ and calculated using the BET method of surface area determination.

In the present description, the term "bimodal" means that the particle size distribution (PSD) curve exhibits two peaks wherein one peak may even exist as a hump, shoulder or tail relative to the other peak. A bimodal PSD curve can be deconvoluted into two separate PSD curves. Deconvoluting the bimodal PSD curve can be done by any convenient well-known algorithm but is typically done by means of an appropriate computer software program.

The bimodality of the particle size distribution of the filler composition is due to the difference in the PSD of two separate components. In other words, the bimodal filler is a composition comprising at least two components, having different average particle sizes from each other that, when blended together, have a bimodal PSD. Preferably, the PSD of each of the components individually is unimodal but the average particle size is different from each other such that, when mixed, the resulting composition has an overall bimodal distribution.

In the present description, the term "dX value" where X is 50 or 90 and is the measured particle diameter upper limit for particles falling within the bottom 50 percent or 90 percent by mass, respectively, of the particle distribution. For example, a d50 value of 0.3 μm means 50 percent of the particles in the distribution by mass have a diameter of greater than 0.3 μm and 50 percent of the particles by mass have a diameter lower than 0.3 μm. The d50 value is also referred to as the median or average particle size herein.

In the present description, the term "nanosized inorganic particles" refers to platelet particles having a nanometer size range in at least one dimension thereof. Generally the platelet particles can be described as modified clay materials with very high aspect ratios (the ratio of an object's length to its thickness). Thus the particles may also be described as having a very minimal thickness or diameter relative to their length.

In the present description, the term "natural magnesium dihydroxide" indicates the magnesium dihydroxide obtained by milling minerals based on magnesium dihydroxide, such as brucite and the like. Brucite is found in nature as such or, more frequently, in combination with other minerals, such as calcite, aragonite, talc or magnesite, usually in stratified form between silicate deposits, such as in serpentine, in chlorite, or in schists.

Natural magnesium dihydroxide generally contains various impurities deriving from salts, oxides and/or hydroxides of other metals, such as Fe, Mn, Ca, Si, V, etc. The amount and nature of the impurities present can vary as a function of the origin of the starting material.

In the present description, the term "plastomer" refers to ethylene-$C_{3-8}$ α-olefin copolymers wherein ethylene is the major constituent prepared using metallocene catalysts. Metallocene or "single site" catalysts having at least one cyclopentadienyl or analogous ligand coordinated to a transition metal cation as well as plastomers produced using such catalysts systems are known. Metallocene catalysts and polymerization processes are described in U.S. Pat. No. 5,017,714 and U.S. Pat. No. 5,324,820 which are incorporated herein by reference in their entirety. Plastomers exhibit both thermoplastic and elastomeric properties.

The preferred plastomer is a copolymer of ethylene and $C_8$ α-olefin comonomers. In general embodiments, the plastomer comprises from about 87 to about 97.5 mole percent of ethylene and from about 2.5 to about 13 mole percent of an α-olefin. In some embodiments, the plastomers may have a density of less than about 0.92 $g/cm^3$. Plastomers having densities from about 0.89 to about 0.91 $g/cm^3$ are particularly advantageous for the compositions. Plastomer copolymers are described in more detail in U.S. Pat. No. 6,207,754 which is incorporated herein by reference.

In some embodiments, the ethylene-α-olefin plastomer has a Melt Index (MI) from about 0.1 g/10 min up to about 50 g/10 min; however, in a highly useful embodiment, the plastomer has a MI between about 0.25 to about 20 g/10 min. Copolymers of ethylene with octene-1 are highly useful plastomers and are available from commercial sources.

In the present description, the term "platelet particles" refers to particles having two relatively flat opposite faces, the thickness of which is the distance between the faces, which is relatively small compared to the size of the faces. The platelet particles include an exfoliated layered inorganic material. The platelet particles have the thickness of the individual layers or small multiples less than about 10, preferably less than about 5, and more preferably less than about 3 of the layers, and still more preferably 1 or 2 layers. Preferably, intercalation of every interlayer space is complete so that all or substantially all individual layers delaminate one from the other to form separate platelet particles.

In the present description, the term "submicron" refers to particles having at least one dimension that is in the range of less than about 1 μm.

In the present description, the term "unimodal" means the particle size distribution (PSD) curve does not substantially exhibit multiple components (i.e., no humps, shoulders or tails exist or are substantially discernible in the PSD curve).

ASTM Standards

ASTM D 412 Test Methods for Vulcanized Rubber and Thermoplastic Elastomers—Tension: The term "ASTM D 412" as used herein refers to the standard test method to evaluate the tensile (tension) properties of vulcanized thermoset rubbers and thermoplastic elastomers. The deters determination of tensile properties starts with test pieces taken from the sample material and includes the preparation of the specimens and the testing of the specimens. Specimens may be in the shape of dumbbells, rings or straight pieces of uniform cross-sectional area. Measurements for tensile stress, tensile stress at a given elongation, tensile strength, yield point, and ultimate elongation are made on specimens that have not been prestressed. Tensile stress, yield point, and tensile strength are based on the original cross-sectional area of a uniform cross-section of the specimen. Measurement of tensile set is made after a previously unstressed specimen has been extended and allowed to retract by a prescribed procedure. Measurement of "set after break" is also described. This test method was approved on Dec. 10, 2002 and published January 2003, the contents of which are incorporated herein by reference in its entirety. For the referenced ASTM standards, visit the ASTM website, www.astm.org, or contact ASTM Customer Service at service@astm.org.

ASTM D 638 Test Method for Tensile Properties of Plastics: The term "ASTM D 638" as used herein refers to the standard test method for determining the tensile properties of unreinforced and reinforced plastics in the form of standard dumbbell-shaped test specimens when tested under defined conditions of pretreatment, temperature, humidity, and testing machine speed. This test method is designed to produce tensile property data for the control and specification of plastic materials. Tensile properties may vary with specimen preparation and with speed and environment of testing. Consequently, where precise comparative results are desired, these factors must be carefully controlled. It is realized that a material cannot be tested without also testing the method of preparation of that material. Hence, when comparative tests of materials per se are desired, the greatest care must be exercised to ensure that all samples are prepared in exactly the same way, unless the test is to include the effects of sample preparation. Similarly, for referee purposes or comparisons within any given series of specimens, care must be taken to secure the maximum degree of uniformity in details of preparation, treatment, and handling. This test method was approved on May 15, 2010 and published June 2010, the contents of which are incorporated herein by reference in its entirety. For the referenced ASTM standards, visit the ASTM website, www.astm.org, or contact ASTM Customer Service at service@astm.org.

ASTM D 746 Test Method for Brittleness Temperature of Plastics and Elastomers by Impact: The term "ASTM D 746" as used herein refers to the standard test method for determining the temperature at which plastics and elastomers exhibit brittle failure under specified impact conditions. To determine the brittleness temperature, specimens are secured to a specimen holder with a torque wrench. The specimen holder is immersed in a bath containing a heat-transfer medium that is cooled. The specimens are struck at a specified linear speed and then examined. The brittleness temperature is defined as the temperature at which 50 percent of the specimens fail. This test method was approved on Jul. 10, 1998 and published January 1999, the contents of which are incorporated herein by reference in its entirety. For the referenced ASTM standards, visit the ASTM website, www.astm.org, or contact ASTM Customer Service at service@astm.org.

ASTM D 792 Test Methods for Density and Specific Gravity (Relative Density) of Plastics by Displacement: The term "ASTM D 792" as used herein refers to the standard test method for determining the specific gravity (relative density) and density of solid plastics in forms such as sheets, rods, tubes, or molded items. The test method includes determining the mass of a specimen of the solid plastic in air, determining the apparent mass of the specimen upon immersion in a liquid, and calculating the specimen's specific gravity (relative density). This test method was approved on Jun. 15, 2008 and published July 2008, the contents of which are incorporated herein by reference in its entirety. For the referenced ASTM standards, visit the ASTM website, www.astm.org, or contact ASTM Customer Service at service@astm.org.

ASTM D 1238 Test Method for Melt Flow Rates of Thermoplastics by Extrusion Plastometer: The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

ASTM D 1248 Standard Specification for Polyethylene Plastics Extrusion Materials for Wire and Cable: The term "ASTM D 1248" as used herein refers to the standard for identification of polyethylene plastics extrusion materials for wire and cable. Identification primarily focuses on two basic characteristics, density and flow rate (aka melt index). The ASTM D 1248 standard refers the reader to multiple ASTM standards for cell type classification. In general, these test standards cover equipment requirements, sample preparation and methods for determination of various properties required for wire and cable compounds. This test method was published Apr. 1, 2012, the contents of which are incorporated herein by reference in its entirety. For the referenced ASTM standards, visit the ASTM website, www.astm.org, or contact ASTM Customer Service at service@astm.org.

ASTM D 2863 Test Method for Measuring the Minimum Oxygen Concentration to Support Candle-Like Combustion of Plastics (Oxygen Index): The term "ASTM D 2863" as used herein refers to the standard for measuring the minimum oxygen concentration to support candle-like combustion of plastics (Oxygen Index). A small test specimen is supported vertically in a mixture of oxygen and nitrogen flowing upwards through a transparent chimney. The upper end of the specimen is ignited and the subsequent burning behavior of the specimen is observed to compare the period for which burning continues, or the length of specimen burnt, with specified limits for each burning. By testing a series of specimens in different oxygen concentrations, the minimum oxygen concentration is determined. This test method was published October 2000, the contents of which are incorporated herein by reference in its entirety. For the referenced ASTM standards, visit the ASTM website, www.astm.org, or contact ASTM Customer Service at service@astm.org.

Flame Retardant Measurements

FV-2/VW-1 Flame Test—The term "ANCI/UL 44" as used herein refers to the standard detailing the performance requirements and test methods for thermoset-insulated wire and cables. The UL 44 standard refers the reader to UL 2556 for the specific wire and cable test methods. In general, these test standards cover the requirements and methods for determination of electrical, mechanical, and flame characteristics testing. UL 44 (published Sep. 10, 2010) and UL 2556 (published on Mar. 22, 2013) are incorporated herein by reference in its entirety. For the referenced UL standards, visit the IHS website, http://www.global.ihs.com/ or contact IHS Customer Service at Email: global@ihs.com.

The specimen is suspended over absorbent cotton, and kraft paper is set on the specimen. The flame is applied to each specimen for a total of five 15-second applications and 15 seconds between application. If flaming persists, then wait until the fire is extinguished—if the flaming is less than 15 seconds, wait 15 seconds and reapply flame; if the flaming is more than 15 seconds, reapply flame immediately. The analyst records information including glowing particles, color, smoke, and burn times greater than 15 seconds.

Pass requirements include: (1) no specimen should flame more than 60 seconds following any of the five, 15-second flame applications; (2) no specimen shall ignite cotton and no greater than 25 percent of indicator flag burned or charred ((a) soot that can be removed with cloth or fingers and (b) brown scorching are to be ignored) after any of five flame applications; (3) no specimen shall emit flaming/glowing particles/flaming drops that ignite the cotton (flameless charring of cotton is to be ignored); and (4) no specimen should flame longer than 60 seconds after any application of flame. When all five specimens pass the test, the composition is judged as "pass."

Limiting Oxygen Index (LOI)—The term "ASTM D 2863" as used herein refers to the standard test method which covers a fire-test-response procedure. In general, this test method describes a procedure for measuring the minimum concentration of oxygen that will just support flaming combustion in a flowing mixture of oxygen and nitrogen. This test method was published December 2012, the contents of which are incorporated herein by reference in its entirety. For the referenced ASTM standards, visit the ASTM website, www.astm.org, or contact ASTM Customer Service at service@astm.org.

Polyolefins without flame retardants have an Oxygen Index of about 16 percent. Values above 21 percent oxygen indicate flame retardant effect. Preferably, LOI should be greater than about 30 percent.

Heat Aging/Physical Properties

Heat Aging Resistance: A test specimen is thermally aged in a circulating air oven at 121 degrees Celsius for 168 hours. The test specimen is then subjected to the tensile test. According to the standard and varies depending on the standard, the samples having an elongation retention [=100×(elongation after aged/elongation before aged)] of at least 60-75 percent or greater and having a tensile strength retention [=100×(tensile strength after aged/tensile strength before aged)] of at least 70-85 percent or greater are judged as "pass". This is based on Table 1 of ICEA publication T-33-655 for both thermoplastic and thermostat compositions. That is the guide for low smoke halogen free (LSHF) polymeric cable jackets. Other standards may be used depending on the particular cable design needed for the end use application of that cable.

Heat Deformation—The term "ANCI/UL 44" as used herein refers to the standard detailing the heat deformation for wire and cable thermoset insulations and thermoplastic jackets. The UL 44 standard refers the reader to UL 2556 which defines the method. In general, this test method covers the requirements and determination of the resistance to deformation of wire and cable insulation and jacket at elevated temperature. UL 44, Table 41 describes load requirements based on wire gauge (aka sample thickness) for a thermoset insulation. After the prescribed time, temperature heating cycle under the specified load (131 degrees Celsius/0.5 hr with 500 to 2000 g load for thermoset insulation and 121 degrees Celsius/1 hr with 2000 g load for thermoplastic jacket), the percent deformation of the cable material is calculated. UL 44 (published Sep. 10, 2010) and UL 2556 (published on Mar. 22, 2013) are incorporated herein by reference in its entirety. For the referenced UL standards, visit the IHS website, http://www.global.ihs.com/ or contact IHS Customer Service at Email: global@ihs.com.

Low-Temperature Characteristics: Test specimen are left in a low-temperature chamber at −10 degrees Celsius for 1 hour, and then wound around a metal bar having the same outer diameter as that of the specimen at least 10 times at −10 degrees Celsius. The specimen are visually checked for cracking. The specimen with no cracks are judged as "pass". See also ASTM D 746 for testing on plaques.

Specifications for Polyethylene Materials for Wire and Cable—The term "ASTM D 1248" as used herein refers to the standard for identification of polyethylene plastics extrusion materials for wire and cable. Identification primarily focuses on two basic characteristics, density and flow rate (aka melt index). The ASTM D 1248 standard refers the reader to multiple ASTM standards for cell type classification. In general, these test standards cover equipment requirements, sample preparation and methods for determination of various properties required for wire and cable compounds. This test method was published Apr. 1, 2012, the contents of which are incorporated herein by reference in its entirety. For the referenced ASTM standards, visit the ASTM website, www.astm.org, or contact ASTM Customer Service at service@astm.org.

Tensile Characteristics: A test specimen is subjected to a tensile test (pulling speed=500 mm/min, reference line distance=20 mm, temperature=23 degrees Celsius). Five specimens are tested for the tensile strength and the tensile elongation at break. The data are averaged to obtain a mean value. According to the UL standard, the samples having a tensile strength of at least 10.3 MPa (1500 psi) and having a tensile elongation at break of at least 100 percent are judged as "pass". Preferably, elongation is above about 200 percent. See also ASTM D 638, ASTM D 412.

In a particular embodiment, the present disclosure provides a low-smoke, non halogenated flame retardant composition made from and/or containing (a) a polypropylene, (b) a first distribution of magnesium dihydroxide particles having a d50 in the range of about 0.75 microns to about 1.25 microns, (c) a second distribution of magnesium dihydroxide particles having a d50 in the range of about 1.50 microns to about 3.50 microns, and (d) aluminum magnesium layered double hydroxide modified with a hydrogenated fatty acid. Preferably, the first distribution of magnesium dihydroxide particles has a d50 in the range of about 0.8 to about 1.1 microns and a specific surface area (BET) in the range of about 9.0 $m^2/g$ to about 11.0 $m^2/g$.

Preferably, the second distribution of magnesium dihydroxide particles a specific surface area (BET) in the range of about 2.5 $m^2/g$ to about 6.0 $m^2/g$. More preferably, the second distribution of magnesium dihydroxide particles has a d50 in the range of about 1.6 to about 2.0 microns and a specific surface area (BET) in the range of about 4.0 $m^2/g$ to about 6.0 $m^2/g$. Even more preferably, the second distribution of magnesium dihydroxide particles has a d50 in the range of about 2.2 to about 3.5 microns and a specific surface area (BET) in the range of about 2.5 $m^2/g$ to about 4.0 $m^2/g$.

Preferably, the first distribution of magnesium dihydroxide has a surface area (BET) of A $m^2/g$ and the second distribution of ax magnesium dihydroxide particles has a specific surface area (BET) of B $m^2/g$ such that the difference of A and B is greater than or equal to about 3 $m^2/g$ (A−B≥3). More preferably, the difference of A and B is greater than or equal to about 5 $m^2/g$ (A−B≥5).

The present disclosure is focused on a polypropylene-based composition. However, persons of ordinary skill in the art will appreciate that the present teaching may be useful in compositions wherein the predominant polymer is not a polypropylene. Suitable polymers include thermoplastic resins, thermosetting resins, and elastomers. Examples may include polyolefins, polyethers (including epoxy resins, polyacetal, polyetheretherketone, polyetherimide, and poly(phenylene oxide)), polyamides (including polyureas), polyamideimide, polyarylate, polybenzimidazole, polyesters (including polycarbonates), polyurethanes, polyamides, polyhydrazides, phenolic resins, polysilanes, polysiloxanes, polycarbodiimides, polyimines, azo polymers, polysulfides, and polysulfones. Preferable examples include polyethylene, polypropylene, ethylene/propylene copolymer, polybutene, poly(4-methylpentene-1), and copolymers of olefins with dienes. More preferably, the predominant polymer is a polypropylene.

Preferably, the predominant polymer is a heterophasic copolymer, prepared by sequential polymerization in at least two stages and in the presence of Ziegler-Natta catalyst supported on a magnesium halide in active form, selected from the group consisting of (a) an olefin polymer composition consisting essentially of
  (i) from about 10 weight percent to about 60 weight percent, based on the total weight of the olefin polymer composition, preferably about 20 weight percent to about 50 weight percent, of
    (A) a propylene homopolymer with isotactic index in the range of about 90 percent to about 99 percent or
    (B) a crystalline propylene copolymer with ethylene, a $CH_2\!=\!CHR$ olefin where R is a 2-8 carbon alkyl radical, or combinations thereof; containing over about 85 weight percent of propylene, based on the weight of the crystalline propylene copolymer, and having an isotactic index in the range of about 85 percent to about 99 percent,
  (ii) from about 8 weight percent to about 40 weight percent, based on the total weight of the olefin polymer composition, of a semicrystalline, ethylene copolymer fraction containing ethylene and propylene, having greater than about 50 weight percent of ethylene, based upon of the total weight of the semicrystalline, ethylene copolymer, and being insoluble in xylene at room temperature, and
  (iii) from about 30 weight percent to about 60 weight percent, based on the total weight of the olefin polymer composition, of an amorphous ethylene-propylene copolymer fraction, preferably 30 weight percent to 50 weight percent, which
    (A) optionally, contains small proportions of a diene, based on the total weight of the amorphous ethylene-propylene copolymer fraction, preferably from about 1 weight percent to about 10 weight percent, more preferably from about 1 weight percent to about 5 weight percent,
    (B) is soluble in xylene at room temperature, and
    (C) contains about 40 weight percent to about 70 weight percent of ethylene, based on the total weight of the amorphous ethylene-propylene copolymer fraction, and
(b) an olefin polymer composition consisting essentially of
  (i) from about 10 weight percent to about 50 weight percent, based on the total weight of the olefin polymer composition, preferably about 10 weight percent to about 40 weight percent, and most preferably about 20 weight percent to about 35 weight percent, of
    (A) a propylene homopolymer having an isotactic index greater than about 80, preferably from about 85 percent to about 99 percent, or
    (B) a copolymer selected from the group consisting of
      (1) propylene and ethylene,
      (2) propylene, ethylene, and a $CH_2\!=\!CHR$ alpha-olefin where R is a $C_{2-8}$ straight or branched alkyl, and
      (3) propylene and a $CH_2\!=\!CHR$ alpha-olefin where R is a $C_{2-8}$ straight or branched alkyl,
      wherein the copolymer contains over about 80 weight percent, based on the total weight of the copolymer, of propylene, preferably from about 85 weight percent to about 99 t percent, and most preferably from about 90 weight percent to about 99 weight percent, and has an isotactic index greater than about 80 percent, preferably greater than about 85 percent to about 99 percent,
  (ii) less than or equal to about 20 weight percent, based on the total weight of the olefin polymer composition, of a copolymer fraction insoluble in xylene at room or ambient temperature, preferably from about 5 weight percent to about 20 weight percent, more preferably from about 7 weight percent to about 15 weight percent, and
  (iii) from about 40 weight percent to about 80 weight percent, based on the total weight of the olefin polymer composition, of a copolymer fraction, preferably from about 50 weight percent to about 70 weight percent, selected from the group consisting of a copolymer of
    (A) ethylene and propylene, wherein the copolymer contains from about 20 weight percent to less than about 40 weight percent, based upon the total weight of the copolymer, of ethylene, preferably about 25 weight percent to about 38 weight percent,
    (B) ethylene, propylene, and a $CH_2\!=\!CHR$ alpha-olefin where R is a $C_{2-8}$ straight or branched alkyl, the alpha-olefin is present in an amount of about 1 weight percent to about 10 weight percent, based upon the total weight of the copolymer, and the total weight of the ethylene and alpha-olefin together is from about 20 weight percent to less than about 40 weight percent, based upon the total weight of the copolymer, preferably about 25 weight percent to about 38 weight percent, and
    (C) ethylene and a $CH_2\!=\!CHR$ alpha-olefin where R is a $C_{2-8}$ straight or branched alkyl containing from about 20 weight percent to less than about 40 weight percent of the alpha-olefin, based on the total weight of the copolymer, which
      (1) optionally, contains about 0.5 weight percent to about 10 weight percent, based on the total weight of the copolymer, of a diene, preferably about 1 weight percent to about 5 weight percent,
      (2) is soluble in xylene at ambient temperature, and
      (3) has an intrinsic viscosity of from about 1.5 dl/g to about 10.0 dl/g, preferably from about 1.5 dl/g to about 5.0 dl/g; more preferably from about 1.5 dl/g to about 4.0 dl/g, most preferably from about 1.7 dl/g to about 3.0 dl/g,
    wherein the total of the (bii) and (biii) fractions is from about 50 weight percent to about 90 weight percent, based on the total olefin polymer composition, preferably from about 65 weight percent to about 80 weight percent, and the weight ratio of (bii)/(biii) being less than about 0.4, preferably from about 0.1 to about 0.3.
  Preferably, component (b)(ii) is selected from the group consisting of
    (A) ethylene and propylene containing over about 55 weight percent, based on the total weight of the copolymer, of ethylene, preferably from about 55 weight percent to about 99 weight percent,
    (B) ethylene, propylene, and a $CH_2\!=\!CHR$ alpha-olefin where R is a $C_{2-8}$ straight or branched alkyl, containing from about 1 weight percent to about 10 weight percent, based on the total weight of the copolymer, of the alpha-olefin and from over about 55 weight percent to about 98 weight percent, based on the total weight of the copolymer, of the spun of the ethylene and alpha-olefin components, preferably from about 80 weight percent to about 95 weight percent, and
    (C) ethylene and a $CH_2\!=\!CHR$ alpha-olefin where R is a $C_{2-8}$ straight or branched alkyl, containing from over about 55 weight percent to about 98 weight percent, based on the total weight of the copolymer, of the alpha-olefin, preferably from about 80 weight percent to about 95 weight percent.

The polymerization process, which can be continuous or batch, is carried out following known techniques and operating in liquid phase, in the presence or not of inert diluent, or in gas phase, or by mixed liquid-gas techniques.

The stereospecific polymerization catalysts comprise the product of the reaction between: 1) a solid component, containing a titanium compound and an electron-donor compound (internal donor) supported on magnesium dihalide (preferably chloride); 2) an aluminum alkyl compound (co-catalyst); and, optionally, 3) an electron-donor compound (external donor).

The magnesium dihydroxide composition can be made using a variety of wet or dry milling methods and equipment known in the art. As understood in the art, a typical wet grinding mill useful for particle size reduction comprises an enclosed vessel filled with small spheres or beads referred to as grinding media, which are activated by an agitator shaft that creates shearing and impacting forces. The rotation of the agitator imparts energy to the surrounding media, and the forces generated act on a slurry of particles continuously pumped through the grinding chamber. The force applied to the particles in the slurry serve to tear apart and/or crush the particles, resulting in an overall reduction in particle size. The grinding media is retained inside the mill during the process. The primary process parameters are solids content of the slurry, agitator speed, product flow rate, and type and size of grinding media. Exemplary types of grinding mills include horizontal disk mills, high-energy pin mills, and the like.

Alternatively and preferably, the magnesium dihydroxide can be produced synthetically via brine or seawater precipitation, the Aman process, or the Magnifin process. The brine or seawater precipitation process utilizes calcium hydroxide ($Ca(OH)_2$) derived from lime (CaO) or dolime (CaO—MgO) to precipitate out magnesium dihydroxide from magnesium chloride ($MgCl_2$) present in the brine or seawater. The Aman process hydropyrolyzes $MgCl_2$ brine solution into magnesium oxide which is later converted into magnesium dihydroxide via a hydration process. The Magnifin process coverts serpentinite ore ($Mg_3[Si_2O_5](OH)_4$) into magnesium dihydroxide via a three step process involving hydrochloric acid leaching, hydropyrolysis, and hydration.

The magnesium dihydroxide particles may be coated with a surface active agent, preferably an anionic surfactant, in order to reduce the tendency of the particles to agglomerate and to enable the particles to disperse more readily in a polymeric resin. Fatty acids and metal salts or esters thereof are preferred surface active coating agents, particularly fatty acids and derivatives thereof having 10 or more carbon atoms. Exemplary surface active agents include stearic acid, oleic acid, erucic acid, lauric acid, behenic acid, and palmitic acid and alkali metal salts thereof (e.g., sodium stearate, potassium stearate, calcium stearate, sodium oleate, potassium oleate, calcium oleate, sodium palmitate, potassium palmitate, calcium palmitate, sodium laurate, potassium laurate, and calcium laurate), ammonium stearate, sodium dilauryl benzenesulfonate, potassium octadecylfsulfate, sodium laurylsulfonate, and disodium 2-sulfoethyl-α-sulfostearate.

Other classes of surface active coating agents that can be used include (i) silane coupling agents such as vinylethoxysilane, vinyl-tris(2-methoxy)silane, γ-methacryloxypropyltrimethoxysilane, γ-aminopropyltrimethoxysilane, β-(3,4-epoxycyclohexyl)ethyltrimethoxysilane, γ-glycidoxypropyltrimethoxysilane and γ-mercaptopropyltrimethoxysilane; (ii) titanate-containing coupling agents such as isopropyltriisostearoyl titanate, isopropyltris(dioctylpyrophosphate), isopropyltri(N-aminoethyl-aminoethyl) titanate and isopropyltridecylbezenesulfonyl titanate; (iii) aluminum-containing coupling agents such as acetoalkoxy-aluminum diisopropylate; (iv) phosphate esters such as mono- or diester of orthophosphoric acid and stearyl alcohol, a mixture of these esters or alkali metal salt of these esters or amine salt of these esters, and (v) anionic surfactants such as amide-bonding aliphatic carboxylate, amide-bonding sulfate, amide-bonding sulfonate, amide-bonding alkylallylsulfonate, sulfates of a higher alcohol such as stearyl alcohol, sulfates of polyethylene glycol ether, ester-bonding sulfates, ester-bonding sulfonates, ester-bonding alkylallylsulfonates, and ether-bonding alkylallylsulfonates. The surface active coating agents can be used singly or as a mixture of two or more.

When the magnesium dihydroxide particles are surface-coated with the above surface-treating agents, the surface coating can be performed using various wet or dry coating methods known in the art. In a wet method, for example, the surface-treating agent in the form of a liquid or an emulsion is added to a slurry of the magnesium dihydroxide particles followed by mechanical mixing. In a dry method, the surface treating agent in the form of a liquid, an emulsion, or a solid is added to the magnesium dihydroxide particles while the magnesium dihydroxide particles are fully stirred in a mixer, with or without the application of heat. In some cases, sufficient heat must be introduced during the mixing process in order to melt the surface-treating agent and, thus, encourage efficient mixing. The heat can be supplied from an external source or generated by the mixer itself.

When the magnesium dihydroxide particles are surface-coated with the above surface-treating agents, the specific surface area of the magnesium dihydroxide particles may be reduced. In one theory, it is reasoned that certain uncoated, magnesium dihydroxide particles of sufficiently large particle size and porosity permit the particles to be coated internally as well as externally. The internal coatings are reasoned to reduce the specific surface area (BET) of the coated, magnesium dihydroxide particles. Use of those magnesium dihydroxide particles in the present embodiment is disclosed. For example, uncoated MAGNIFIN H-5™ magnesium dihydroxide has a surface area (BET) of 4.0 to 6.0 $m^2/g$ while coated MAGNIFIN H-5 GV™ magnesium dihydroxide has a surface area (BET) of 2.0 to 5.0 $m^2/g$.

Suitable magnesium dihydroxide compositions are available commercially from Albemarle Corporation under the tradenames MAGNIFIN and Kyowa Chemical Industry under the tradename KISUMA.

The aluminum magnesium layered double hydroxide modified with a hydrogenated fatty acid is a nanoclay material. In a preferred embodiment, the nanoclay is derived from hydrotalcite, an anionic clay comprising inorganic sheets of Mg and Al. It is commercially available from Akzo Nobel under the trade designation PERKALITE™ FR100 nanoclay. A person of ordinary skill in the art will readily recognize other nanoclay materials that may be substituted for the present nanoclay.

In this embodiment, the low-smoke, non-halogenated flame retardant composition can further include a maleic anhydride grafted polyolefin and an ethylene copolymer having a melt index greater about 2.0 grams/10 minutes measured according to ASTM D 1238 at a load 16 kg and a temperature of 190 degrees Celsius and a density in the range of about 0.89 $g/cm^3$ to about 0.91 $g/cm^3$ measured according to ASTM D 792. Preferably, the ethylene copolymer is an ethylene/octene copolymer having a melt index greater than or equal to about 3.0 grams/10 minutes and a density of about 0.900 $g/cm^3$.

While the preferred composition is a maleic anhydride grafted polyolefin, a person of skill in the art would recognize that other coupling agent containing materials may be used alone or pregrafted onto a polyolefin. Suitable examples include mono- or dicarboxylic acids containing at least one ethylenic unsaturation, or derivatives thereof. More particularly, those examples include maleic acid, maleic anhydride, fumaric acid, citraconic acid, itaconic acid, acrylic acid, methacrylic acid and the like, and the anhydrides or esters derived therefrom, or mixtures thereof. See EP 0530940 for discussion on grafting onto a polyolefin such as a polyethylene or ethylene/α-olefin copolymers.

The amount of grafted coupling agent is generally between about 0.05 and about 5 parts by weight, preferably from about 0.1 to about 2 parts by weight, relative to 100 parts by weight of polyolefin. Polyolefins grafted with maleic anhydride are available as commercial products identified under tradenames such as Integrate™ (LyondellBasell), Fusabond™ (Du Pont), Orevac™ (Elf Atochem), Exxelor™ (Exxon Chemical), and Yparex™ (DSM).

The ethylene copolymer is an elastomer, which can be prepared by a variety of well-known methods. The polymerization can be conducted as solution phase processes, gas phase processes, and the like. The comonomer can be any α-olefin, it is preferably 1-octene. For example, a suitable ethylene copolymer elastomer is available under the tradename Engage™ 8450 from The Dow Chemical Company, such copolymer has 12 weigh percent 1-octene, a melt index of 3.0 g/10 min, and a density of 0.902 g/cm$^3$.

Blends of two or more of these ethylene α-olefin copolymers can also be used in accordance with the present disclosure. The polyethylene copolymer may also be an ethylene propylene elastomer containing a small amount of unsaturated compounds having a double bond. Ethylene copolymers having small amounts of a diolefin component such as butadiene, norbornadiene, hexadiene, and isoprene are also generally suitable, although less preferred.

The low-smoke, non-halogenated flame retardant composition can further include one or more additives known in the art. Exemplary additives include colorants, odorants, deodorants, plasticizers, impact modifiers, fillers, nucleating agents, lubricants, surfactants, wetting agents, other flame retardants, ultraviolet light stabilizers, antioxidants, biocides, metal deactivating agents, thickening agents, heat stabilizers, defoaming agents, coupling agents, polymer alloy compatibilizing agent, blowing agents, emulsifiers, crosslinking agents, waxes, particulates, flow promoters, and other materials added to enhance processability or end-use properties of the polymeric components. Such additives can be used in conventional amounts, which typically do not exceed 10 weight percent of the total composition.

In general embodiments, an additive may be present in the composition in an amount between about 0.001 and about 10 weight percent, based upon the total weight of the composition. In additional embodiments, the additive may be present in any specific amount or any narrower range found between about 0.001 and about 10 weight percent, based upon the total weight of the composition.

Although the flame retardant composition is intended to be halogen-free, in certain situations the use of halogens is not of particular concern. In those situations, the fire retardancy of the composition can be enhanced by the addition of organic halides, such as decabromodiphenyloxide. Normally when halogens are incorporated into a composition, an antimony oxide synergist is included with the composition up to about 10 weight percent to improve flame retardancy by combining the halogens, thus preventing their loss to the atmosphere during combustion.

Examples of halogenated compounds of the above type include perchloropentacyclodecane; Diels-Alder adducts of hexachlorocyclopentadiene with "enes" such as maleic anhydride; hexabromobenzene; pentabromoethylbenzene 2,4,6-tribromophenol; tribromophenyl allyl ether; octaobromodiphenyl; poly(pentabromobenzyl)acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylene-bis(tetrabromophthalmide); hexabromocyclododecane; and the like.

The low-smoke, non-halogenated flame retardant composition can be prepared by mixing the polypropylene, the magnesium dihydroxide, the aluminum magnesium layered double hydroxide modified with a hydrogenated fatty acid, and other additives according to techniques known in the art. The mixing can be carried out, for example, using an internal mixer of the type with tangential rotors (Banbury) or with interpenetrating rotors, or alternatively in continuous mixers such as Ko-Kneader (Buss) or co-rotating or counter-rotating twin-screw mixers.

The compounding equipment should be operated at temperatures below the decomposition temperature of the additive having the lowest decomposition temperature.

In another embodiment, the present disclosure provides a low-smoke, non-halogenated flame retardant composition made from and/or containing (a) a polypropylene, (b) a bimodal distribution of magnesium dihydroxide particles having (i) a first particle size peak in the range of about 0.75 microns to about 1.25 microns and (ii) a second particle size peak in the range of about 1.50 microns to about 3.50 microns, and (c) aluminum magnesium layered double hydroxide modified with a hydrogenated fatty acid. Preferably, the first peak is of a distribution of magnesium dihydroxide particles having a d50 in the range of about 0.8 to about 1.1 microns and a specific surface area (BET) in the range of about 9.0 m$^2$/g to about 11.0 m$^2$/g.

Preferably, the second peak is of a distribution of magnesium dihydroxide particles a specific surface area (BET) in the range of about 2.5 m$^2$/g to about 6.0 m$^2$/g. More preferably, the second distribution of magnesium dihydroxide particles has a d50 in the range of about 1.6 to about 2.0 microns and a specific surface area (BET) in the range of about 4.0 m$^2$/g to about 6.0 m$^2$/g. Even more preferably, the second peak is of a distribution of magnesium dihydroxide particles has a d50 in the range of about 2.2 to about 3.5 microns and a specific surface area (BET) in the range of about 2.5 m$^2$/g to about 4.0 m$^2$/g.

The magnesium dihydroxide of this embodiment has a bimodal particle size distribution curve that can be deconvoluted into at least two separate PSD curves. Preferably, each PSD curve represents at least about 10 weight percent and more preferably at least about 20 weight percent.

The present disclosure does not preclude the particle size distribution of the magnesium dihydroxide composition being multimodal. As such, the particle size distribution curve may be deconvoluted with the freedom to fit more than two peaks.

In this embodiment, the low-smoke, non-halogenated flame retardant composition can further include a maleic anhydride grafted polyolefin and an ethylene copolymer having a melt index greater about 2.0 grams/10 minutes measured according to ASTM D 1238 at a load 2.16 kg and a temperature of 190 degrees Celsius and a density in the range of about 0.89 g/cm$^3$ to about 0.91 g/cm$^3$ measured according to ASTM D 792. Preferably, the ethylene copolymer is an ethylene/octene copolymer having a melt index greater than or equal to about 3.0 grams/10 minutes and a density of about 0.900 g/cm$^3$.

In yet another embodiment, the present disclosure provides a power cable having a conductor core, a semiconductive conductor shield, an insulation layer, a semiconductive insulation shield, and a jacket made from and/or containing a low-smoke, non-halogenated flame retardant composition. The low-smoke, non-halogenated flame retardant composition may be made from or contain (a) a polypropylene, (b) a first distribution of magnesium dihydroxide particles having a d50 in the range of about 0.8 microns to about 1.1 microns and a specific surface area (BET) in the range of about 9.0 m$^2$/g to about 11.0 m$^2$/g, (c) a second distribution of magnesium dihydroxide particles selected from the group consisting of (i) magnesium dihydroxide particles having a d50 in the range of about 1.60 microns to about 2.0 microns and a specific surface area (BET) in the range of about 4.0 m$^2$/g to about 6.0 m$^2$/g and (ii) magnesium dihydroxide particles having a d50 in the range of about 2.2 microns to about 3.5 microns and a specific surface area (BET) in the range of about 2.5 m$^2$/g to about 4.0 m$^2$/g, (d) aluminum magnesium layered double hydroxide modified with a hydrogenated fatty acid, (e) a maleic anhydride grafted polyolefin, and (f) an ethylene/octene copolymer having a melt index greater or equal to about 3.0 grams/10 minutes measured according to ASTM D 1238 at a load 2.16 kg and a temperature of 190 degrees Celsius and a density of about 0.900 g/cm$^3$ measured according to ASTM D 792.

Alternatively, the low-smoke, non-halogenated flame retardant composition may be made from and/or contain (a) a polypropylene, (b) a bimodal distribution of magnesium dihydroxide particles having (i) a first particle size peak in the range of about 0.75 microns to about 1.25 microns and (ii) a second particle size peak in the range of about 1.50 microns to about 3.50 microns, (c) aluminum magnesium layered double hydroxide modified with a hydrogenated fatty acid, (d) a maleic anhydride grafted polyolefin, and (e) an ethylene/octene copolymer having a melt index greater or equal to about 3.0 grams/10 minutes measured according to ASTM D 1238 at a load 2.16 kg and a temperature of 190 degrees Celsius and a density of about 0.900 g/cm$^3$ measured according to ASTM D 792.

Depending upon the desired cable construction, the low-smoke, non-halogenated flame retardant composition can thus be used to coat the conductor directly or produce an outer self-extinguishing sheath on the conductor which has been precoated with an insulating layer.

The coating step is generally carried out by means of extrusion. When two layers are present, the extrusion can be carried out in two separate steps by extruding the inner layer onto the conductor in a first run and then the outer layer onto this inner layer in a second run. The coating process can advantageously be carried out in a single run, for example, by means of a "tandem" method, wherein two separate extruders arranged in series are used or alternatively, by co-extrusion using a single extrusion head.

EXAMPLES

The following non-limiting examples illustrate the invention.

LyondellBasell HIFAX X1956A polypropylene (having a density of 0.89 g/cm$^3$ and a melt flow rate of 1.2 g/10 min measured at 230 degrees Celsius/2.16 kg), LyondellBasell ADFLEX Q 100 F polypropylene (having a density of 0.88 g/cm$^3$ and a melt flow rate of 0.6 g/10 min measured at 230 degrees Celsius/2.16 kg) and LyondellBasell INTEGRATE™ PMG6040 maleic anhydride grafted polypropylene were preblended in a ratio 50:45:5 weight percent and then pelletized using a twin-screw extruder. The preblend was admixed the following additives: (a) 0.1 weight percent of SONGNOX 1010 antioxidant (available from Songwon Industrial Company), (b) 1.3 weight percent of titanium dioxide, 0.1 weight percent of CHIMASSORB 944 oligomeric hindered amine light stabilizer (available from Ciba Specialty Chemicals), (c) 0.1 weight percent of SONGNOX 1680 phosphite antioxidant (available from Songwon Industrial Company), (d) 0.5 weight percent of SONGNOX 1024 metal deactivator and antioxidant (available from Songwon Industrial Company), (e) 0.3 weight percent of zinc 2-mercaptoimidazole, and (f) 5 weight percent of PERKALITE FR-100 aluminum magnesium layered double hydroxide modified with a hydrogenated fatty acid (available from Akzo Nobel).

The magnesium dihydroxide materials were MAGNIFIN H-5 GV and MAGNIFIN H-10 IV (both available from Albemarle Corporation). MAGNIFIN H-5 GV is a high-purity magnesium dihydroxide modified with a polymeric surface treatment. It has a d50 in the range of 1.60 microns to 2.0 microns and a specific surface area (BET) in the range of 2.0 m$^2$/g to 5.0 m$^2$/g. MAGNIFIN H-10 IV is a high-purity magnesium dihydroxide, surface treated with an amino polysiloxane. It has a d50 in the range of 0.80 microns to 1.1 microns and a specific surface area (BET) in the range of 9.0 m$^2$/g to 11.0 m$^2$/g.

| Component | Comp. 1 | Ex. 2 | Ex. 3 | Comp. 4 |
|---|---|---|---|---|
| Preblend and Additives | 35 | 35 | 35 | 35 |
| H-5 GV | 65 | 25 | 40 | 0 |
| H-10 IV | 0 | 40 | 25 | 65 |
| Flame Retardancy | | | | |
| VW-1 | Fail | Pass | Pass | Pass |

Figure 1:
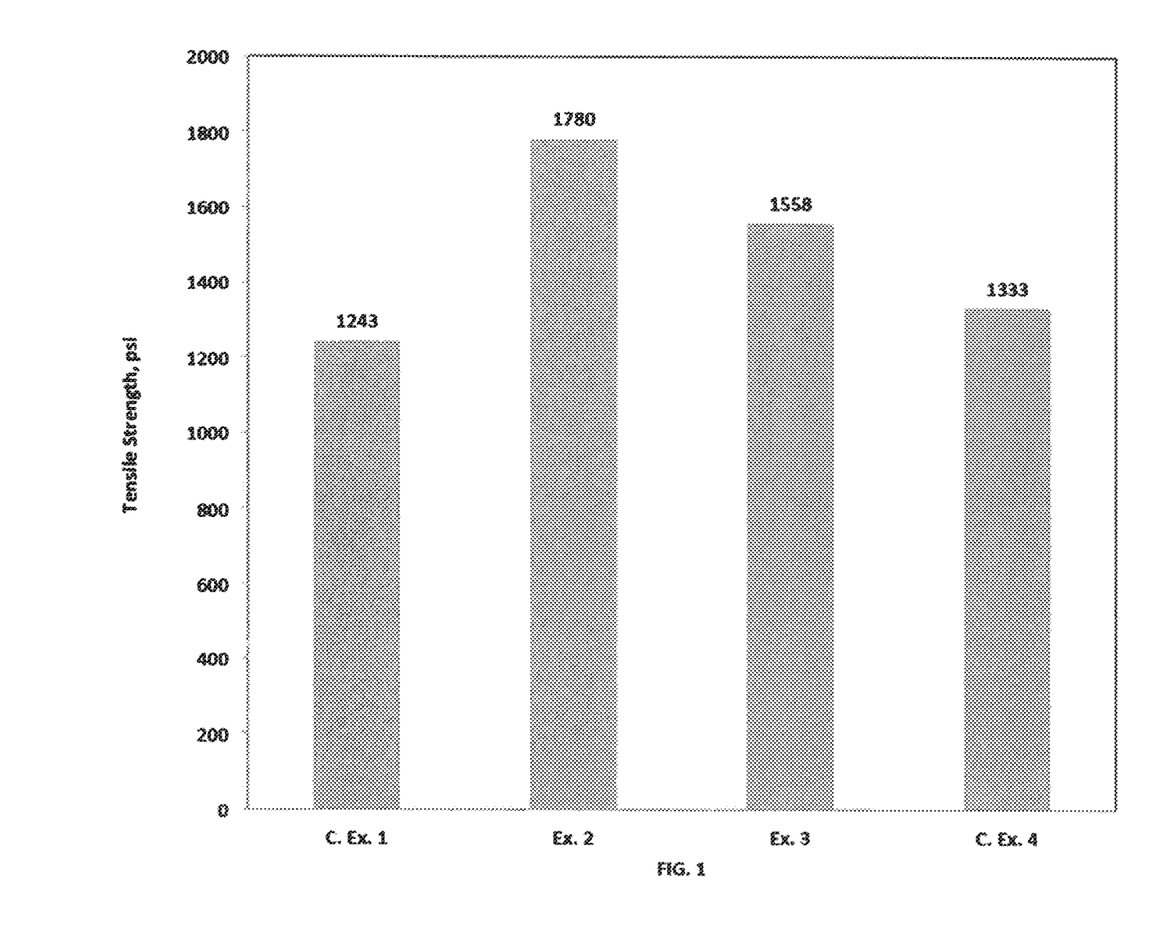
FIGS. 1 and 2 are graphs depicting the effect of combining two particle size distributions of magnesium dihydroxide in the presence of an aluminum magnesium layered double hydroxide modified with a hydrogenated fatty acid in a polypropylene-based flame retardant composition, on the physical properties of appropriate test specimens.
Figure 2:
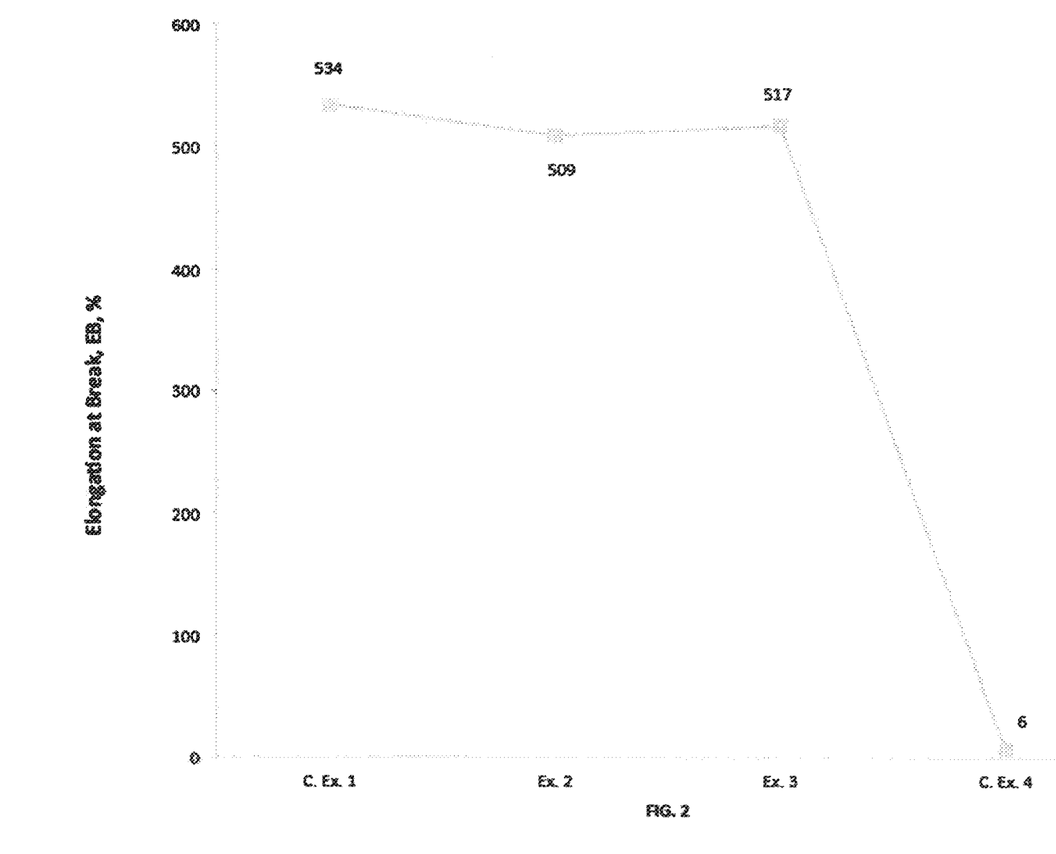

The four samples were also evaluated for physical properties. Those results are depicted in the graph of FIG. 1.

What is claimed is:

1. A low-smoke, non-halogenated flame retardant composition comprising:
   (a) a polypropylene;
   (b) a first distribution of magnesium dihydroxide particles having a d50 in a range of 0.75 microns to 1.25 microns;
   (c) a second distribution of magnesium dihydroxide particles having a d50 in a range of 1.50 microns to 3.50 microns; and
   (d) an aluminum magnesium layered double hydroxide modified with a hydrogenated fatty acid.

2. The low-smoke, non-halogenated flame retardant of claim 1, further comprising:
   (e) a maleic anhydride grafted polyolefin; and
   (f) an ethylene copolymer having a melt index of greater than 2.0 grams/10 minutes and a density in a range of 0.89 g/cm$^3$ to 0.91 g/cm$^3$.

3. The low-smoke, non-halogenated flame retardant of claim 2, wherein the ethylene copolymer is an ethylene/octene copolymer having a melt index of greater than or equal to 3.0 grams/10 minutes and a density of 0.900 g/cm$^3$.

4. The low-smoke, non-halogenated flame retardant of claim 1, wherein the first distribution of magnesium dihydroxide particles has a specific surface area (BET) in a range of 9.0 m$^2$/g to 11.0 m$^2$/g.

5. The low-smoke, non-halogenated flame retardant of claim 1, wherein the second distribution of magnesium dihydroxide particles has a specific surface area (BET) in a range of 2.5 m$^2$/g to 6.0 m$^2$/g.

6. The low-smoke, non-halogenated flame retardant of claim 1, wherein the first distribution of magnesium dihydroxide has a surface area (BET) of A m$^2$/g and the second distribution of magnesium dihydroxide particles has a specific surface area (BET) of B m$^2$/g such that the difference of A and B is greater than or equal to 3 m$^2$/g (A−B≥3).

7. A low-smoke, non-halogenated flame retardant composition comprising:
(a) a polypropylene;
(b) a bimodal distribution of magnesium dihydroxide particles having
(i) a first particle size peak in a range of 0.75 microns to 1.25 microns, and
(ii) a second particle size peak in a range of 1.50 microns to 3.50 microns;
(c) an aluminum magnesium layered double hydroxide modified with a hydrogenated fatty acid.

8. The low-smoke, non-halogenated flame retardant of claim 7, further comprising:
(d) a maleic anhydride grafted polyolefin; and
(e) an ethylene copolymer having a melt index of greater than 2.0 grams/10 minutes and a density in a range of 0.89 g/cm$^3$ to 0.91 g/cm$^3$.

9. The low-smoke, non-halogenated flame retardant of claim 8, wherein the ethylene copolymer is an ethylene/octene copolymer having a melt index of greater than or equal to 3.0 grams/10 minutes and a density of 0.900 g/cm$^3$.

10. A power cable comprising a jacket comprising the low-smoke, non-halogenated flame retardant composition of claim 1 and further comprising:
(a) a conductor core;
(b) a semiconductive conductor shield;
(c) an insulation layer; and
a semiconductive insulation shield.

* * * * *